United States Patent [19]

Honkomp et al.

[11] Patent Number: 5,176,495
[45] Date of Patent: Jan. 5, 1993

[54] THERMAL SHIELDING APPARATUS OR RADIOSITOR FOR A GAS TURBINE ENGINE

[75] Inventors: Mark S. Honkomp, Cincinnati, Ohio; Allewis A. Greninger, Enfield, Conn.

[73] Assignee: General Electric Company, Cincinnati, Ohio

[21] Appl. No.: 727,189

[22] Filed: Jul. 9, 1991

[51] Int. Cl.⁵ .................................................. F01D 5/20
[52] U.S. Cl. ................................. 415/173.1; 415/178; 415/180; 415/177
[58] Field of Search ............ 415/177, 178, 175, 170.1, 415/173.1, 173.4, 191, 208.1, 209.2

[56] References Cited

U.S. PATENT DOCUMENTS

| | | | |
|---|---|---|---|
| 3,656,862 | 4/1972 | Rahaim et al. | 415/171 |
| 3,728,041 | 4/1973 | Bertelson | 415/189 |
| 4,087,199 | 5/1978 | Hemsworth et al. | 415/174 |
| 4,101,242 | 7/1978 | Coplin et al. | 415/134 |
| 4,309,145 | 1/1982 | Viola | 415/170 R |
| 4,398,866 | 8/1983 | Hasrtel et al. | 415/180 |
| 4,405,284 | 9/1983 | Albrecht et al. | 415/174 |
| 4,433,845 | 2/1984 | Shiembob | 415/173.5 |
| 4,525,998 | 7/1985 | Schwarz | 60/226.1 |
| 4,565,492 | 1/1986 | Bart et al. | 415/175 |
| 4,642,024 | 2/1987 | Weidner | 415/175 |
| 4,826,397 | 5/1989 | Shook et al. | 415/175 |

FOREIGN PATENT DOCUMENTS

| | | | |
|---|---|---|---|
| 0060309 | 5/1977 | Japan | 415/177 |
| 0182306 | 9/1985 | Japan | 415/178 |
| 2131099 | 6/1984 | United Kingdom | 415/178 |

Primary Examiner—Thomas E. Denion
Attorney, Agent, or Firm—Jerome C. Squillaro; John R. Rafter

[57] ABSTRACT

A thermal shielding apparatus for use in the low pressure stage of a turbine engine having a plurality of tubular honeycomb cells which are axially aligned and arranged perpendicularly to a radially outwardly directed heat flux. The cells are layered and are housed by an inner and outer liner. The outer liner and an outer casing form a space between them, the outer casing being located radially outward from the outer liner. The layers of honeycomb cells reduce radiant heat flow to the outer casing.

6 Claims, 4 Drawing Sheets

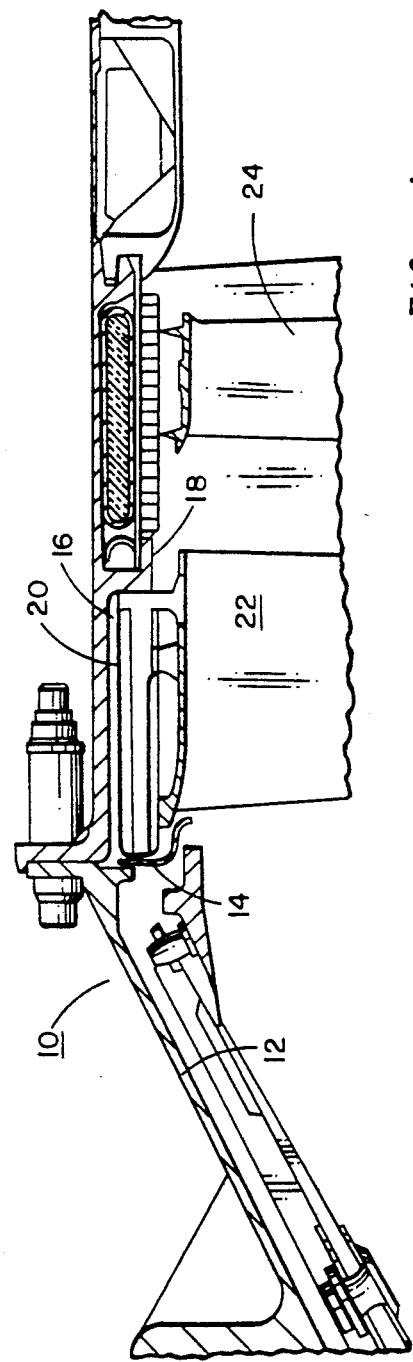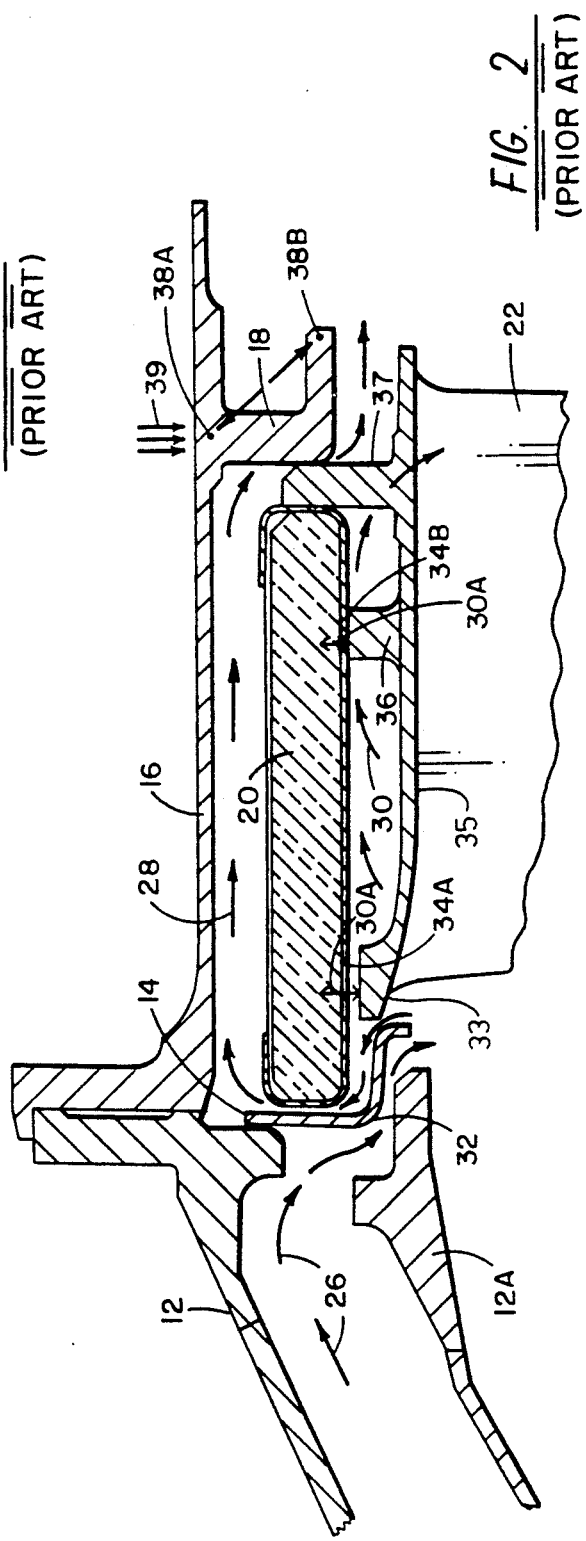

THERMAL SHIELDING APPARATUS OR RADIOSITOR FOR A GAS TURBINE ENGINE

CROSS-REFERENCES

This case is related to co-pending patent application Ser. Nos. 07/727,268; 07/727,186; and 07/727,182 filed concurrently herewith.

BACKGROUND OF THE INVENTION

The present invention relates to devices which control radiant heat flow and has particular application as a thermal shield in gas turbine engines where it is used to protect the engine casing from the detrimental effects of hot gases.

Control of the radial propagation of heat by radiation and convection from an axially flowing hot gas stream to surrounding parts poses a significant problem to gas turbine engine designers. Excessive thermal cycling of these surrounding parts creates clearance problems due to material growth and shrinkage. Special materials must be used for these parts that are capable of withstanding the extreme high temperatures and thermal stresses encountered. These factors coupled with the vibrational stresses of engine operation can lead to premature fatigue failure of the parts, as well as their mounting provisions. As the temperatures of the (main) hot gas stream are increased to improve engine operating efficiencies, these problems are exacerbated.

One approach to controlling or limiting radial heat propagation is to utilize pressurized cooling air to limit the heat rise in the surrounding parts by impingement and convection cooling. Pressurized cooling air is also utilized to thwart radial leakage flow of hot gases through clearance gaps between those components defining the outer bounds of the main gas stream. Since pressurized cooling air is tapped from the compressor output leading to the combustor, engine performance and efficiency suffer as the amount of air utilized for cooling is increased. Thus, it is important to use cooling air efficiently and then only where absolutely necessary.

Another approach is to utilize thermal shielding to limit radial heat propagation. It will be appreciated that effective use of thermal shielding can reduce the amount of air cooling required or even eliminate the need for air cooling. One location where thermal shields are used to reduce radial heat transfer by radiation and convection is between the engine case and the vane tip platforms or outer bands of the first stage low pressure turbine nozzle. These thermal shields have taken the form of blankets of fibrous insulating material retained between inner and outer sheet metal liners. It has been found that these shields offer little structural resistance to pounding levels of oscillatory vibration, high temperatures due to hot gas streams, intense localized convection heat transfer, and abrasion damage from adjacent components, such as the casting upstanding from the outer nozzle bands. The combination of these destructive mechanisms degrades the insulative quality of the shields and eventually results in the complete disintegration thereof.

SUMMARY OF THE INVENTION

Accordingly, one object of the present invention is to provide a durable thermal shield which reduces radiation and convection heat transfer in a gas turbine engine.

Another object of the present invention is to protect the outer case from over temperature exposure by minimizing hot gas leakage across the casing wall.

Yet another object of the present invention is to reduce floating seal leakage path problems due to eccentricity between the TMF outer seal and the TMF outer liner.

Still another object of the present invention is to increase the thermal fatigue life of the TMF outer seal by reducing the radial temperature gradients and stress across the seal.

These and other valuable objects and advantages of the present invention are accomplished by an insulator box assembly for insulating a turbine stage of a gas turbine engine. The assembly is comprised of an inner liner and an outer liner. A plurality of honeycomb cells which are aligned perpendicularly to a radially outwardly directed heat flux are connected to and placed between the inner and outer liners. The honeycomb cells insulate a casing, located radially outward from the outer liner, from thermal radiation. The honeycomb cells act as a heat transfer reducing device and proffer thermal resistance by controlling radiative conductance. Further, the assembly is provided with sealing means for sealing and isolating the casing from heated gas flow. The sealing means connects to the inner and outer liner to form a singular structure which serves an insulative and sealing function.

BRIEF DESCRIPTION OF THE DRAWINGS

A more complete appreciation of the invention and many of the attendant advantages thereof will be readily understood by reference to the following detailed description when considered in connection with the accompanying drawings wherein:

FIG. 1 is a simplified schematic side view illustration depicting the turbine mid frame and the forward portion of the low pressure turbine stage of a prior art turbine engine;

FIG. 2 is a simplified schematic side view illustration of the NGV support structure of a prior art turbine engine and emphasizes points of thermal fatigue and cracking;

When referring to the drawings, it is understood that like reference numerals designate identical or corresponding parts throughout the respective figures.

THE DETAILED DESCRIPTION OF THE INVENTION

Figure 3A:
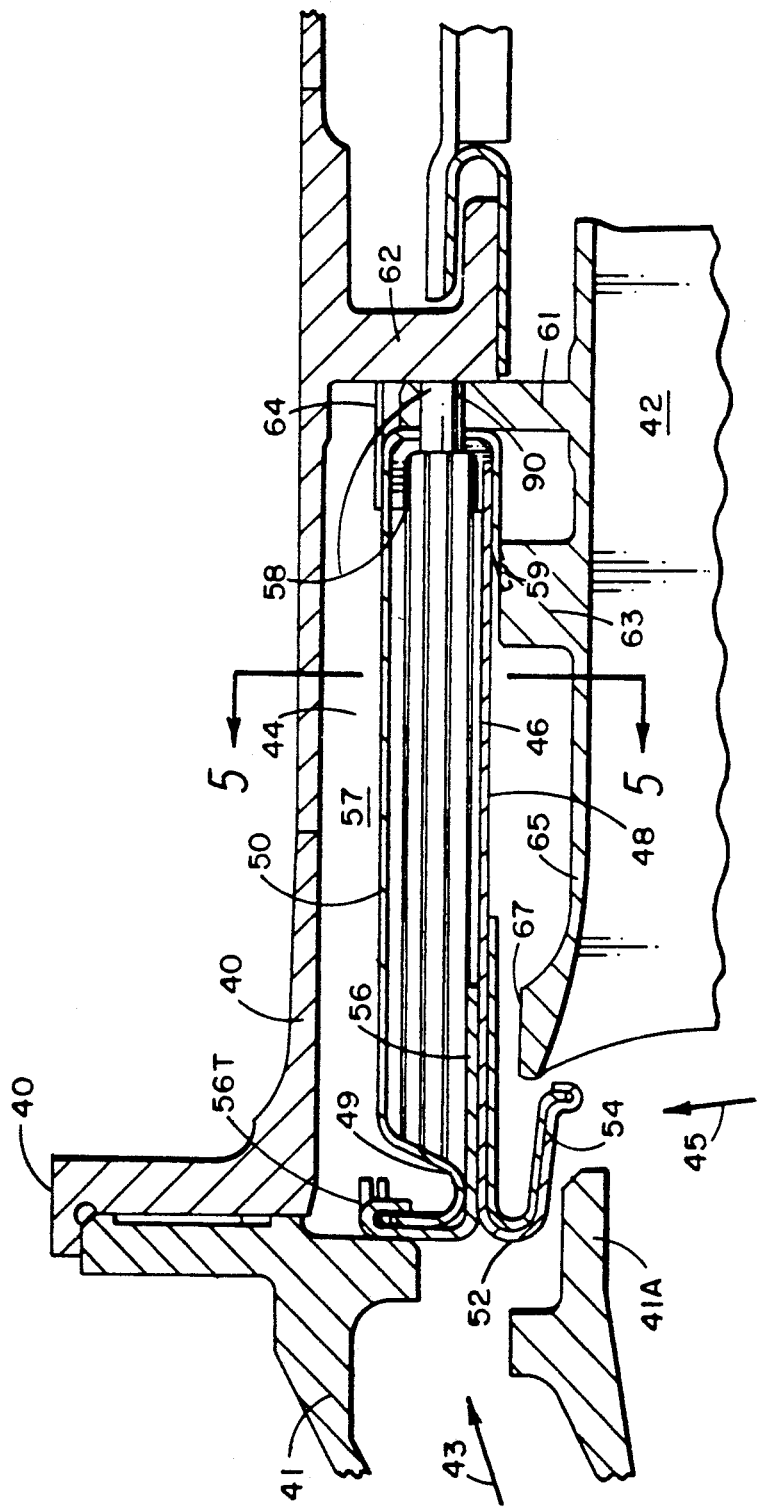
FIG. 3A is a simplified schematic side view illustration of the insulation assembly according to a first embodiment of the present invention.

The prior art schematic illustration of FIG. 1 shows the forward portion of a low pressure turbine stage 10 of a gas turbine engine which has a turbine mid frame (TMF) 12 connected to a low pressure turbine (LPT) case 16. An insulator 20 made of two 180° sheet metal boxes that capture fibrous insulating material lies between the LPT case 16 and nozzle guide vane (NGV) 22. A case rail 18 which is integrally connected to case 16 is positioned to the aft of the insulator 20. A rotor blade 24 of a first row of LPT rotor blades is positioned to the aft of NGV 22.

For further edification, FIG. 2 provides a schematic illustration of the forward portion of a prior art gas turbine engine which is similar to FIG. 1. The turbine mid frame 12 is connected to LPT case 16 which is integrally connected to case rail 18. A 360° ring 14 impedes the path of cooling gas flow 26 which follows the path formed by the TMF 12 and TMF inner section 12A. Cooling gas flow 26 has a temperature of approximately 700° F. Point 32 indicates a wear location on ring 14 which typically experiences separation due to wear, large thermal gradients, and thermal fatigue cracking. Arrow 28 indicates a hot fluid flow path which is present in the cavity located between the case 16 and insulator 20. Hot gas flow path 28 extends through the cavity formed by circumferential gaps between NGV segments and flange 37 of NGV 22 and case rail 18. An additional flow path 30 of hot gas originating radially inward from insulator 20 is directed toward the underside of insulator 20. The arrows indicated at 39 indicate that case 16 is impingement cooled. Points 38A and 38B located below arrows 39 in the case rail 18 indicate locations which typically experience thermal fatigue cracking due to large changes in temperature gradients.

NGV 22 (FIG. 2) is provided with a flange 37 which contacts case rail 18 as a result of gas loads, with flange 37 contacting the end portion of the insulator 20 as well. NGV 22 is further provided with a platform area 35 having a forward extended area 33 and a boss 36 that support the insulator 20. During engine operation, vibrations indicated by arrows 30A cause platform forward extended area 33 to frictionally engage wear contact region 34A. The vibrations 30A further cause boss 36 to frictionally engage wear contact region 34B. Contact regions 34A and 34B are located at the bottom of insulator 20. The vibrations 30A cause axial and circumferential movement which results in wear penetration of the insulator box and disintegration of the fibrous material due to hot gas attack.

FIG. 3A illustrates an insulator box assembly 44 according to a first embodiment of the present invention, hereinafter referred to as a radiositor. The box assembly has an annular outer liner 50 and an annular inner liner 48 which are both made of Hast-X sheet metal. The inner liner 48 is located radially inward of the outer liner 50. Inner liner 48 is divided into four 90° segments and outer liner 50 is divided into four 90° segments for purposes of forming four boxes which extend circumferentially around a plurality of NGV segments such as NGV segment 42.

NGV segment 42 is provided with a platform 65 which is located at the radially outward end of NGV segment 42. Platform 65 is provided with a platform forward extension 67 at the front of the platform, a plurality of bosses such as boss 63 are located at circumferentially spaced apart positions on the platform, and a flange 61 is located to the aft of bosses 63.

The outer liner 50 has a hooked forward end portion 49 which is integrally connected to outer liner 50. Outer liner 50 comprises an annular sheet metal ring having an axially aft edge bent downwardly and forwardly to conform to a generally forward facing U-shape which ends at lip extension 59.

Figure 3B:
FIG. 3B is a side view isolated illustration of the outer liner according to the present invention.

With reference to FIG. 3B, the lip extension 59 of outer liner 50 is bent radially inward. The extension 59 has a plurality of circumferentially spaced apart slots aligned with bosses 63. However, lip extension 59 does not make contact with bosses 63.

The outer liner 50 has an axially forward edge bent downwardly and upwardly to conform to a generally upwardly facing U-shape, the upwardly facing U-shape forward end 49 acting as an axially compressible spring member.

Inner liner 48 has a forward liner extension 52 which is sawcut with a plurality of circumferentially spaced apart slots for thermal expansion purposes and integrally connected to the inner liner 48. Liner extension 52 is supported by sawcut panel 54 which extends from the front of inner liner 48 to a position located above the platform forward extension 67 of NGV segment 42. However, the sawcut slots of forward liner extension 52 and panel 54 do not overlap, but are circumferentially offset. Extension 52 and panel 54 are fastened to ring 56. Liner extension 52 and panel 54 protect ring 56 from the detrimental thermal effects of high temperature working medium flow gas 45. Liner extension 52 and panel 54 eliminate high local hoop stresses due to temperature gradients and serve to dampen vibratory responses of the structure. Panel 54 is located above platform forward extension 67 but does not touch extension 67.

With further reference to FIG. 3A, a 360° L-605 sheet metal ring 56 is positioned between the hooked forward end 49 of outer liner 50 and the forward liner extension 52 of inner liner 48. The ring has a generally U-shaped cross-section and is positioned to receive the spring member of the outer liner so that the ring is urged against the casing wall. The ring is relatively flexible in an axial direction which allows the spring member of the outer liner to act as a securing mechanism. The ring includes an axially directed radially outer flange and an axially directed radially inner flange, the outer flange including four circumferentially spaced bendable tabs 56T which are aligned with slots in the outer liner and bent into the slots for inhibiting circumferential rotation of the ring.

Ring 56, liner 52, and panel 54 are interconnected, and can slide as a unit relative to lip extension 59 when end 49, which acts as a spring, becomes axially loaded by TMF case 41 during assembly of case 41 to case 40. The elasticity of ring 56 and forward end 49 provide a spring-like connection with the turbine mid frame 41 such that the ring 56, hooked end 49, forward extension liner 52, and flow restrictor panel 49 provide a barrier to fluid flow 43. Cooling gas flow 43 flows in the path provided by the TMF 41 and inner portion of the TMF 41A. The barrier provided by ring 56, hooked end 49, and extension liner 52 prevents cooling gas flow 43 and high temperature working medium gas flow 45 from entering the annular space 57 located between the LPT case 40 and outer liner 50.

A plurality of pins 58 brazed to outer liner 50 at the rear region of outer liner 50 is formed to fit into round and oval slots 90 and 92 located in the flange region 61 of NGV segment 42. (Pins 58 are further discussed subsequently in the commentary concerning FIG. 4.) Connected to the rear of outer liner 50 and making contact with case rail 62 of LPT case 40 is flow restrictor panel 64. Panel 64 prevents fluid flow from entering cavity 57 via an entrance located to the rear of the insulator box assembly 44. Furthermore, tangential seals (not shown) between segments of NGV's discourage ingestion of hot gases into the annular space 57.

The insulator box assembly 44 (FIG. 3A) is therefore understood to be comprised of ring 56, outer liner 50, inner liner 48, pins 58, and rear liner extension 59 which are connected to form a single structure which performs both sealing and insulating functions with enhanced durability since local contact with the NGV platform is eliminated. The pins 58 perform insulator/NGV concentricity control by restricting radial displacement of the insulator with respect to NGV segment 42, while allowing thermal expansion. The box assembly 44 is filled with a plurality of honeycomb cells 46 located between the outer liner 50 and inner liner 48. Cells 46 are positioned perpendicular to the direction of heat flow.

The box assembly shown in FIG. 3A is assembled by SEAM welding ring 56, inner liner 48, and panel 54 to form a 360° ring/liner assembly. Pins 58 are attached to outer liner 50 by brazing or welding so that the round and oval heads of the pins 58 extend axially through the round and oval holes 51 in outer liner 50 (see FIG. 3B). The nozzle segments such as nozzle segment 42 are bolted to the turbine mid frame of an inner bolt circle on a cone-shaped flange (not shown). The flange 61 of each nozzle segment 42 are provided with round and oval slots 90 and 92 (FIG. 4) for the purpose of receiving the round and oval shaped heads of pins 58 connected to outer liner 50. For instance, where there are twelve 30° nozzle segments and four 90° outer liners, each 90° outer liner would be matched with respective flanges of three nozzle segments (see FIG. 4).

Figure 4:
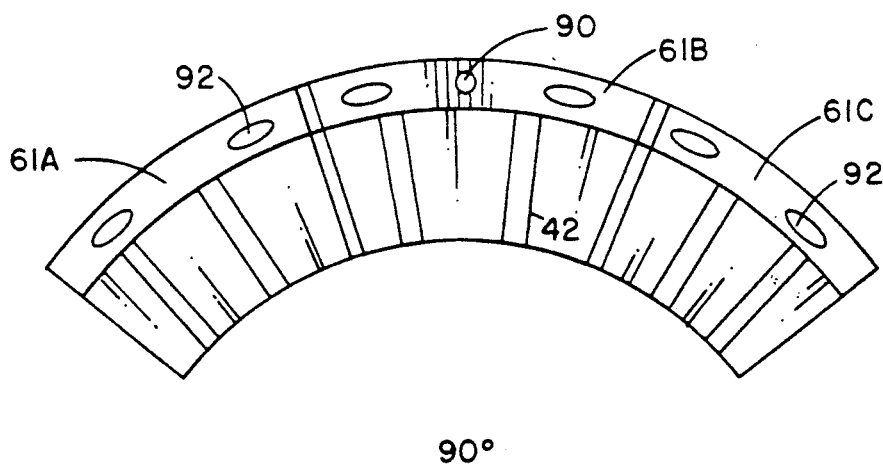
FIG. 4 is a schematic illustration of a 90° section of three nozzle segments which connect to the radiositor box assembly of the present invention by means of pins.

Each three nozzle set such as shown in FIG. 4 includes one center 61B and two adjacent flanges 61A and 61C. The center flange 61B includes an axial circular hole 90 sized to accept a round pin 58, and two circumferentially extending oval slots sized to accept two oval pins 58, with circumferential clearance for thermal growth. The two adjacent flanges 61A and 61C have two circumferentially extending oval slots 92 sized to accept two oval pins with circumferential clearance for thermal growth. Each segment of outer liner 50 has a round hole for accommodating the pin which connects to round slot 90 and has six oval slots for accommodating the oval pins which connect to oval slots 92 (FIG. 4). For further elaboration on the subject of nozzle segments in a gas turbine engine, the reader may consult U.S. Pat. Nos. 4,309,145 and 3,728,041 which are herein incorporated by reference.

The four 90° outer liners are installed on the nozzle segments (after the nozzle segments have been bolted to the turbine mid frame) by aligning the pins on each outer liner 50 with the corresponding holes in the flanges of the respective nozzle segments.

The boxes formed by the outer liners 50 and inner liners 48 are filled with a plurality of honeycombs 46 which can be brazed or place fitted to the outer liners 50. The honeycombs 46 provide an insulative function which is superior as a thermal barrier and more durable than the insulation blankets of the prior art. The honeycombs 46 can be a 360° continuous piece or a plurality of circumferentially extending segments.

The 360° ring/inner liner assembly is pressed into place axially. The tabs on ring 56 are bent over slots in outer liner 50. The axial downstream end of the inner liner 48 is supported radially by lip extension 59 on outer liner 50. When case flange 41 is bolted to LPT case flange 40, the bend 49 in liner 50 can deform so that ring 56 is urged against case 41 for sealing.

Figure 5:
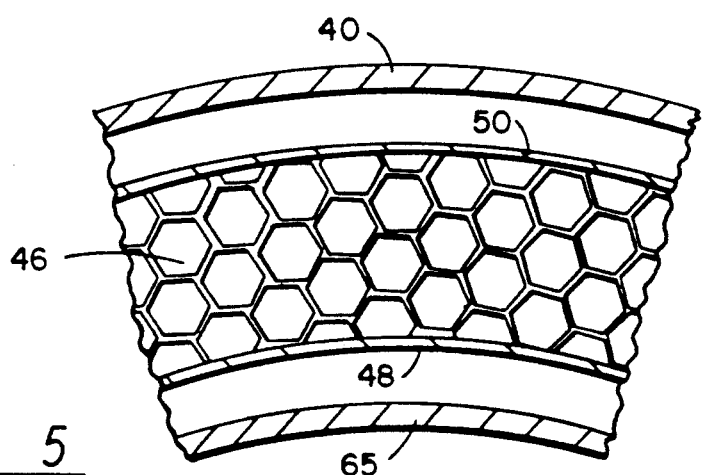
FIG. 5 is a frontal cross-sectional schematic illustration taken along line 5—5 of FIG. 3A which depicts the axially aligned honeycomb cells of the present invention.

With reference to FIG. 5, the honeycomb cells 46 are hexagonally shaped and aligned in an axial direction with respect to the axis of the engine. The honeycomb cells 46, outer liner 50, and inner liner 48 are shown to be situated between LPT case 40 and nozzle outer platform 65. The honeycomb cells 46 are tubular with each cell having a preferable width of 3/32 of an inch with the walls of the cells having a preferable thickness of 0.003 inches such that a foil-like consistency is achieved. The width and thickness of the cells can of course be somewhat varied from the above figures without deviating from the spirit of the present invention. While other combinations of cell widths and cell wall thicknesses can be used, it is desirable to maintain the ratio of the cell wall area to total cross-sectional area of the honeycomb as small as possible and preferably no more than 14%. Each opening of the tubular honeycombs is parallel to the direction of heat flow with the plurality of honeycomb cells being positioned in a perpendicular manner to the direction of heat flow. The gas flow through the honeycomb cells will be minimal due to the sealing means provided by the ring 56, outer liner 50, and inner liner 48.

The honeycomb can be fabricated from a hastelloy alloy such as hastelloy-X. Ideally, the emissivity of the honeycomb material is kept as low as possible. A hastelloy alloy with an emissivity of about 0.5 at operating temperatures is acceptable.

The four 90° boxes formed by the inner liner 48 and outer liner 50 are filled with the honeycombs cells 46. The layers of space which isolate the hexagonal tubes of the honeycomb cells 46 form a sequential shield which reduces thermal radiation in a sequential manner. Furthermore, the tubular, axially aligned arrangement of honeycomb cells prevents crossflow of hot gases thereby minimizing convective heat transfer. The thinness of the cells permits deflection flexibility when subject to differential thermal growth and minimizes fin conduction heat transfer effects. The inner liner 48 protects the honeycomb cells 46 from direct hot gas impingement and from installation damage.

Figure 6A:
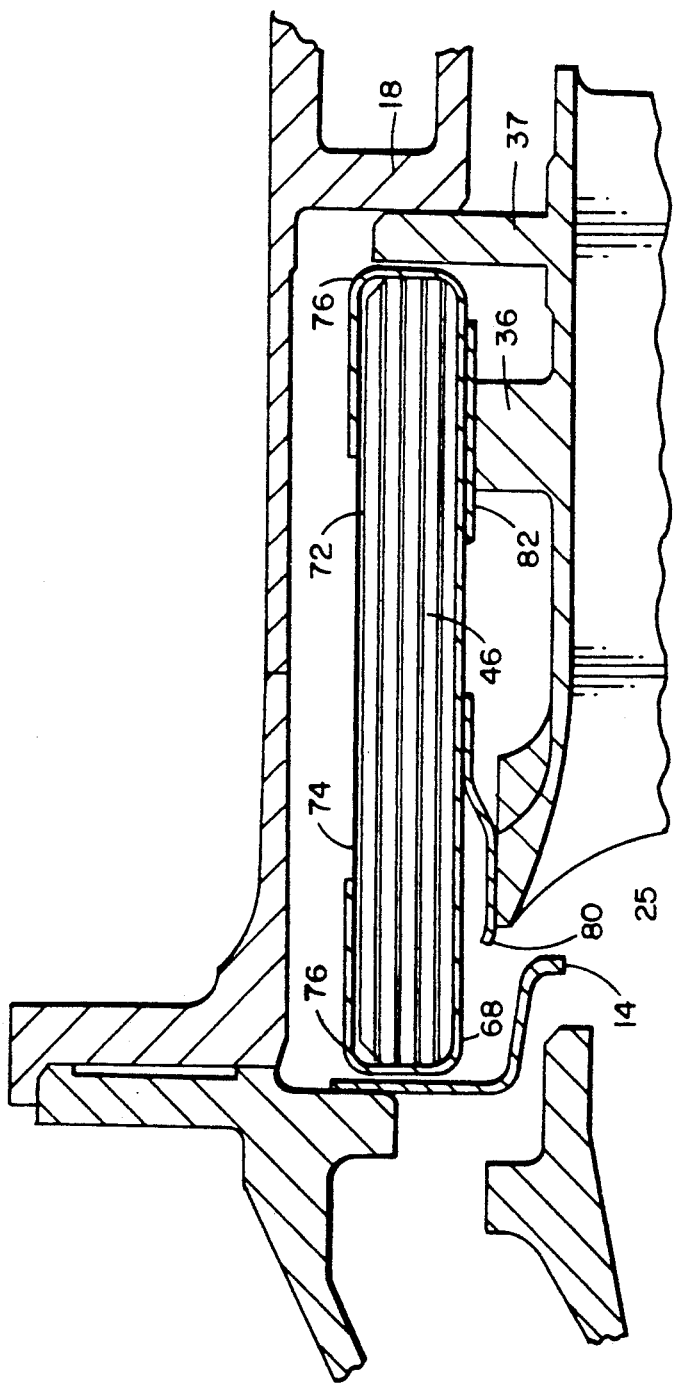
FIG. 6A is a schematic side illustration depicting a honeycomb box assembly according to a second embodiment of the present invention, the box assembly being comprised of two 180° segments.
Figure 6B:
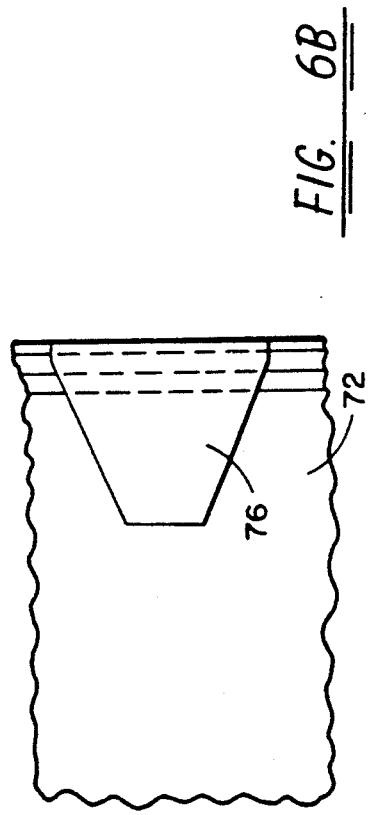
FIG. 6B is a top view schematic illustration of the honeycomb box assembly of FIG. 6A.

With reference to FIG. 6A, an insulator box assembly 74 is depicted according to a second embodiment of the present invention. An inner liner 68 is integrally connected to tabs 76. A plurality of honeycomb cells 46 is placed over the inner liner 68, aligned in an axial manner, and brazed thereto whereupon the cells 46 are brazed to the outer liner 72. To fasten the box assembly 74 so that a closed and secure structure is realized, the tabs 76 at the forward and rear ends of the inner liner are bent over the outer liner and spot welded thereto. Box assembly 74 extends 180°. Two 180° box assemblies such as box assembly 74 are joined by end pieces which are subsequently discussed. FIG. 6B portrays how the tabs are folded over the outer liner 72. Tabs 76 are provided at intermittent circumferential locations about box assembly 74.

With further reference to FIG. 6A, wear pad 80 which has an elongated "S" shape is connected to the bottom of inner liner 68. Wear pad 80 is made of an L-605 cobalt alloy which has good lubricity for reducing friction. Wear pad 82 is connected to the bottom of inner liner 68 and is made of an L-605 cobalt alloy. Wear pad 80 reduces radial motion vibration induced due to pivoting about boss 36 and protects inner liner 68 from vibrationally induced damage from platform 35 of NGV 22. Wear pad 82 protects inner liner 68 from vibrationally induced damage from boss 36 of NGV 22.

Figure 7:
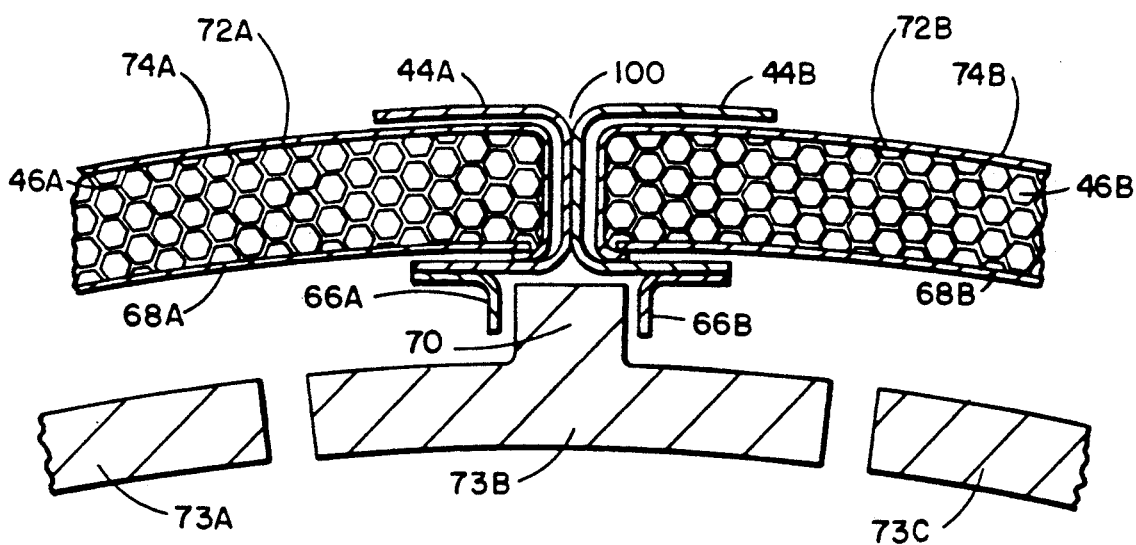
FIG. 7 is a simplified schematic axial illustration which depicts how the box assemblies of the second embodiment (FIG. 6A) are constrained by end pieces.

With reference to FIG. 7, an axial schematic illustration according to the second embodiment of the invention (FIG. 6A) depicts how end piece 100 slidably receives the two 180° insulator box assemblies 74A and 74B. Box assembly 74A is comprised of outer liner 72A, inner liner 68A, and honeycomb cells 46A, and box assembly 74B is comprised of outer liner 72B, inner liner 68B, and honeycomb cells 46B. End piece 100 is comprised of accommodating section 44A, accommodating section 44B, and slot sections 66A and 66B.

Accommodating section 44A slidably receives box assembly 74A and accommodating section 44B slidably receives box assembly 74B. Slot sections 66A and 66B form a slot into which boss 70 of NGV segment 73B connects. Boss 70 is understood to correspond to one of the bosses 36 (FIG. 6A). The box assemblies 74A and 74B extend circumferentially around NGV segments 73A, 73B, 73C, etc. A second end piece (not shown) is located 180° from end piece 100 for purposes of accommodating the other ends of box assemblies 74A and 74B. Thus, the end pieces are supported on bosses 180° apart.

The radiositor of the present invention impedes heat transfer by a synergistic combination of effects. First, the present invention isolates regions of convection to the hot (gas path) side of the device and away from the casings. Second, the present invention retards any internal convective heat transfer by enclosure of tubular spaces of hexagonal-shaped honeycomb. Hexagonally-shaped honeycomb is used for manufacturing convenience; however, other shapes and insulator types could be used without deviating from the scope of the claimed invention. Third, the present invention limits internal conduction by uniformly expanding a small amount of a relatively high conductive material (i.e., the sheet metal of the honeycombs) over a large volume such that the density of conductive material is greatly reduced. Fourth, the present invention reduces the heat flux potential by making radiation the dominant heat transfer mechanism available by which heat may flow.

The term "radiositor" is used in regard to the present invention because the present invention controls radiant heat flow. The degree of control is a function of how many layers of honeycombs are used. The present invention reduces radiant heat flow by dividing the potential of a single temperature difference into many differences via layers. The present invention exploits the nature of the non-linear functional relationship between radiation and temperature.

The foregoing detailed description of the respective embodiments of the present invention have been intended to be illustrative and non-limiting. Many changes and modifications are possible in light of the above teachings. Thus, it is understood that the invention may be practiced otherwise than as specifically described herein and still be within the scope of the appended claims.

We claim:

1. A thermal insulation assembly for protecting an outer casing from a high temperature working medium gas flow, the assembly being located radially inward from an annular space formed by the outer casing, said thermal insulation assembly comprising:
   (a) a plurality of honeycomb cells wherein
      (i) said plurality of honeycomb cells comprises a plurality of layers of honeycomb cells for controlling radiant heat flow, said plurality of layers aligned parallel to a radially outwardly directed heat flux, and
      (ii) each of said plurality of honeycomb cells includes a longitudinal axis arranged perpendicularly to said radially outwardly directed heat flux; and
   (b) housing means connected to the plurality of honeycomb cells for housing the plurality of honeycomb cells.

2. An assembly according to claim 1 wherein the housing means comprises an outer liner connected to an inner liner.

3. An assembly according to claim 1 wherein each honeycomb cell of said plurality of honeycomb cells has a cell wall area which is less than 14% of a total cross-sectional area of said each honeycomb cell.

4. An assembly according to claim 1 wherein said plurality of honeycomb cells is made of a hastelloy alloy having an emissivity of less than 0.5.

5. An assembly according to claim 1 wherein said plurality of honeycomb cells is made of a hastelloy alloy having an emissivity of approximately 0.5.

6. An assembly according to claim 2 wherein the annular space is comprised of a space located between a radially inner surface of the outer casing and the outer liner.

* * * * *